United States Patent
Nozaki

(10) Patent No.: US 6,950,204 B2
(45) Date of Patent: Sep. 27, 2005

(54) PHOTO PRINTING METHOD AND SYSTEM USING A PLURALITY OF PRINTERS

(75) Inventor: Iwao Nozaki, Wakayama (JP)

(73) Assignee: Noritsu Koki Co., Ltd., Wakayama-ken (JP)

( * ) Notice: Subject to any disclaimer, the term of this patent is extended or adjusted under 35 U.S.C. 154(b) by 815 days.

(21) Appl. No.: 09/818,994

(22) Filed: Mar. 27, 2001

(65) Prior Publication Data

US 2001/0052996 A1 Dec. 20, 2001

(30) Foreign Application Priority Data

Mar. 29, 2000 (JP) .......................... 2000-091492

(51) Int. Cl.[7] .................. G06F 13/00; G06K 15/02
(52) U.S. Cl. ........................ 358/1.15; 358/1.13
(58) Field of Search .................. 358/1.1–1.18; 709/102, 103, 223, 224, 228, 229; 710/1, 7, 19, 31–34, 46–47

(56) References Cited

U.S. PATENT DOCUMENTS

| | | |
|---|---|---|
| 5,689,755 A | 11/1997 | Ataka |
| 6,145,031 A | 11/2000 | Mastie et al. |
| 6,348,971 B2 * | 2/2002 | Owa et al. .................. 358/1.15 |

FOREIGN PATENT DOCUMENTS

| | | |
|---|---|---|
| EP | 0 545 261 A | 6/1993 |
| JP | 06-131135 | 5/1994 |
| JP | 9265141 | 10/1997 |
| JP | 1078620 | 3/1998 |
| JP | 10-239780 | 9/1998 |
| JP | 2000-066856 | 3/2000 |
| WO | WO-00 72579 A | 11/2000 |

* cited by examiner

*Primary Examiner*—Douglas Tran
(74) *Attorney, Agent, or Firm*—Fulbright & Jaworski L.L.P.

(57) ABSTRACT

A photo printing system for transmitting image information including photo frame image data to a plurality of printers (P) through signal paths to print images, with a memory (41) for loading image information transmitted from an image input device (7), and a print order managing unit (50) for managing said image information on an order-by-order basis. The print order managing unit (50) includes a distributing unit (53) for applying printer IDs identifying the printers used, as attribute data, to the image information in the respective orders, a printer control unit (51) for checking an operating status of each of said printers, and a data output unit (54) for transmitting, based on a signal from said printer control unit, photo frame image data in an image file to be printed from said memory to one of said printers specified by the attribute data of said image file.

10 Claims, 11 Drawing Sheets

PHOTO PRINTING METHOD AND SYSTEM USING A PLURALITY OF PRINTERS

BACKGROUND OF THE INVENTION

1. Field of the Invention

This invention relates to a photo printing technique using a processing device for transmitting image information to a plurality of printers through signal paths to print images.

2. Description of the Related Art

In a photo printing technique employing the above construction, a processing device capable of image processing may be connected to a plurality of printers through signal paths such as communication cables, and image information may be transmitted from the processing device to the printers. In printing images with this system, the printers are selectively used and image information is transmitted thereto by manual operations carried out at the side of the processing device.

In making numerous prints, a processing time may be reduced by distributing the image information to the plurality of printers. However, where the distribution is done manually, the operator must distinguish the states of the printers to determine which printer has finished printing, and transmit image information to that printer. This operation must be repeated until all required prints are made. Not only is this operation too time-consuming and troublesome, but also a proper distribution process may not be performed. For example, a delay could occur in the distributing operation, or the operator could make an error in the order of priority for a printing process. Thus, there is room for improvement.

Japanese Patent Laying-Open Publication H10-78620, for example, discloses a technique for varying an order of printing according to requested delivery times after receiving a plurality of orders for prints. However, this publication does not describe a manner of managing image data in the plurality of orders to be transmitted to printers for printing.

In particular, photo prints may be made from image information acquired with digital cameras fast becoming widespread today. When this printing process is performed at a photo processing shop, a storage medium storing image information acquired with a digital camera may be brought in to make prints. Even though the photo processing shop may have a plurality of printers, it is not only time-consuming to select printers manually, but also difficult to make a proper distribution of image information in a proper order, in handling a large number of storage media received. In addition, when prints are made from such storage media, it is necessary to manage, as a unit, a plurality of image data stored in each storage medium by allocating an order number. Such a complex process may not allow the printing process to be completed in a short time.

SUMMARY OF THE INVENTION

The object of this invention is to provide an improved technique of printing images by managing a plurality of printers while dispensing with a complex operation.

The above object is fulfilled, according to this invention, by a photo printing method for transmitting image information to a plurality of printers through signal paths to print images, comprising an order managing step for managing inputted image information on an order-by-order basis, a distributing step for distributing orders to the plurality of printers to be printed, and an outputting step for outputting image information included in each order distributed, to a selected printer based on an operating status of the selected printer.

With the above method, the order managing step is executed to manage a plurality of pieces of image information on the order-by-order basis, and the distributing step and outputting step are executed to distribute the image information to the plurality of printers, with the orders assigned to the respective printers. This requires no special operation performed by the operator. Prints obtained by this processing are outputted by the printers as sorted for the orders, which facilitates management of each order. Here, the order is a unit of service requested. Take image information acquired with digital cameras and saved in storage media for example. One order is a unit for handling, en bloc, a plurality of pieces of image information saved in one storage medium.

In a preferred embodiment of the invention, the distributing step includes assigning priorities to the orders, and the outputting step includes outputting the image information in an order of higher priority to one of the printers in a state for accepting printing data.

Thus, the distributing step is executed to assign priorities to a plurality of orders, and the outputting step is executed to transmit image information in an order of higher priority to one or more of the printers in a state for accepting printing data. Thus, while increasing the operating rate of all the printers, printing is completed the earlier for orders of the higher priority. Particularly since printing data is transmitted to the printers in a state for accepting data, idle time is reduced to realize efficient processing, compared with the case of transmitting data after fully completing printing of a preceding order.

Preferably, printing data in corresponding orders is divided in units of frames and successively transmitted, to data storage devices of the printers, amounts of data for the number of frames storable in the data storage devices.

Even where each printer is equipped with a data storage device such as a buffer or memory having a capacity not large enough to store all image information in one order, printing data in the orders corresponding each printer is divided in units of frames and amounts of data storable in the data storage device are transmitted successively. Thus, image information may continue to be transmitted without interruption to the plurality of printers, compared, for example, with the case of executing a next process after all image information in an order corresponding to one printer is transmitted to the printer.

It is preferred that, when printable image information is image information in one order and the plurality of printers are available for printing, frame image information in that order is transmitted as distributed to the plurality of printers.

When printing printable image information in only one order, image information for a plurality of frames included in that order is distributed to the plurality of printers. Thus, image information for a plurality of frames may be printed in a short time.

A photo printing system for transmitting image information including photo frame image data to a plurality of printers through signal paths to print images, according to this invention, comprises a memory for loading image information transmitted from an image input device, a print order managing unit for managing the image information on an order-by-order basis, a distributing unit for applying printer IDs identifying the printers used, as attribute data, to the image information in the respective orders, a printer control unit for checking an operating status of each of the printers, and a data output unit for transmitting, based on a signal from the printer control unit, photo frame image data in an image file to be printed from the memory to one of the printers specified by the attribute data of the image file.

This system realizes the same advantages as provided by the method described above.

Where the distributing unit applies the attribute data to the respective photo frame image data, additional information regarding a printing process may be provided for each photo frame image data. This achieves a thorough-going printing service.

Particularly where the distributing unit applies different printer IDs to the photo frame image data belonging to the image file of the same print order, the photo frame image data included in the same print order may be printed speedily by distributing the image data to the plurality of printers.

Thus, the technique proposed by this invention provides an improved method and system for managing a plurality of printers to enable quick printing on an order-by-order basis, without requiring a troublesome operation to be carried out by the operator. Not only improving the operating rate of the printers, but also orders of higher priority may be finished early. Even where the printers have small-capacity data storage devices, a printing process is performed without interruption. When only one order is put to a printing process, prints are made promptly.

Other features and advantages of this invention will be apparent from the following description of the embodiment to be taken with reference to the drawings.

DESCRIPTION OF THE PREFERRED EMBODIMENTS

An embodiment of this invention will be described hereinafter with reference to the drawings.

Figure 1:
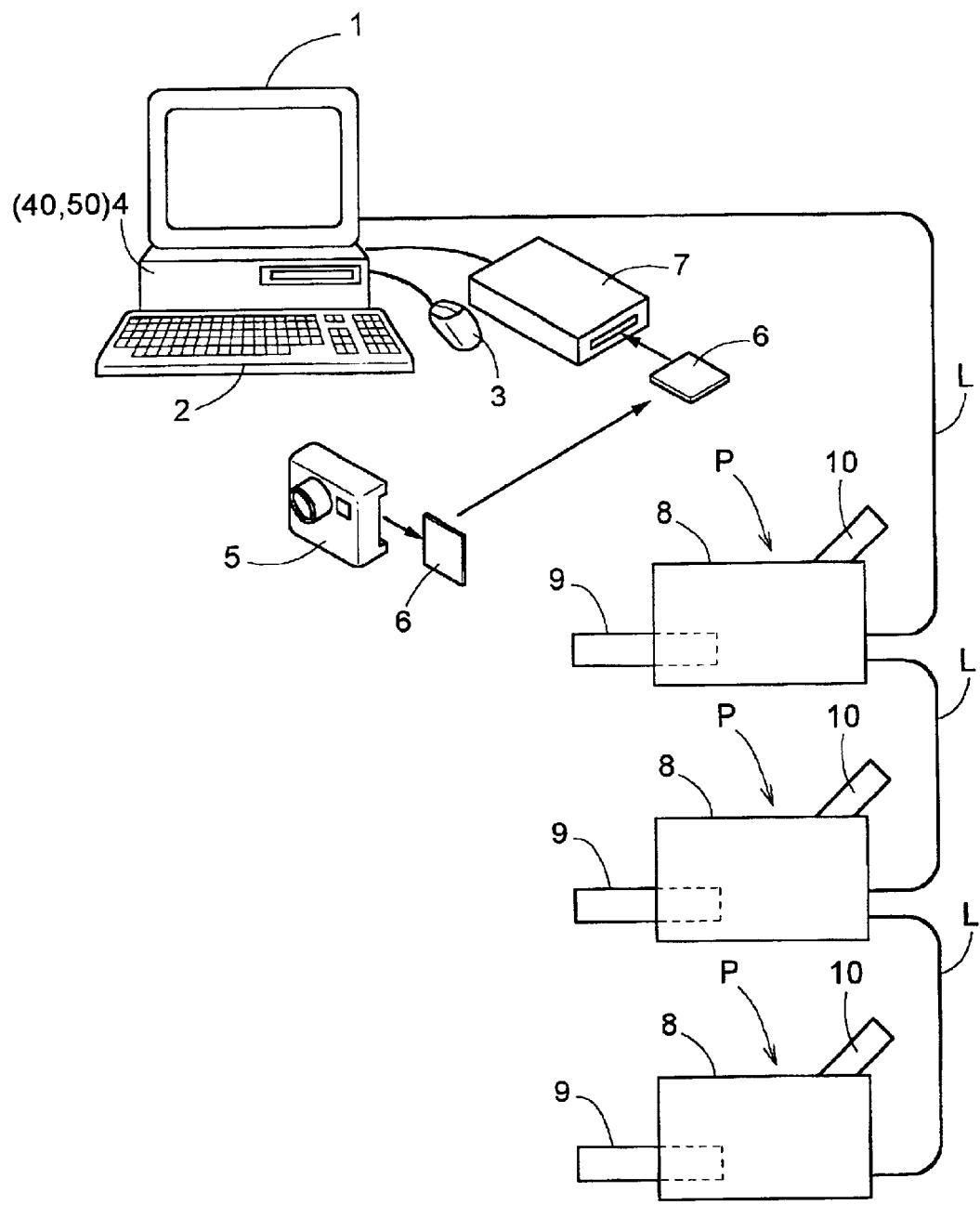
FIG. 1 is an overall view of a photo printing system.

As shown in FIG. 1, a photo printing system includes an image processing device 40 and a print order managing device 50 formed of hardware and software with a general-purpose computer 4 acting as a core element. The computer 4 has a display 1 such as a CRT or liquid crystal display, and a keyboard 2 and a mouse 3 acting as command input devices. The computer 4 has also a media reader 7 acting as an image input device for fetching image information from a storage medium 6 such as a CompactFlash card or Smart-Media card storing image information acquired with a digital camera 5. A plurality of printers P are connected to the computer 4 through signal paths L. In this photo printing system, the signal paths L are formed of SCSI buses, and ID numbers are affixed to the respective printers P. Each printer P has a sublimate print head built into a main body 8, prints images with the print head on printing paper set in a cassette 9, and outputs the printing paper to a discharging portion 10.

In this photo printing system, the computer 4 saves the image information inputted from the media reader 7 to a hard disk or memory built into the computer 4. The computer 4 has a program set thereto for performing a color correction and a brightness correction of the image information (image files, frame image data and so on) stored, and distributing the image information to the printers P for printing images.

Figure 2:
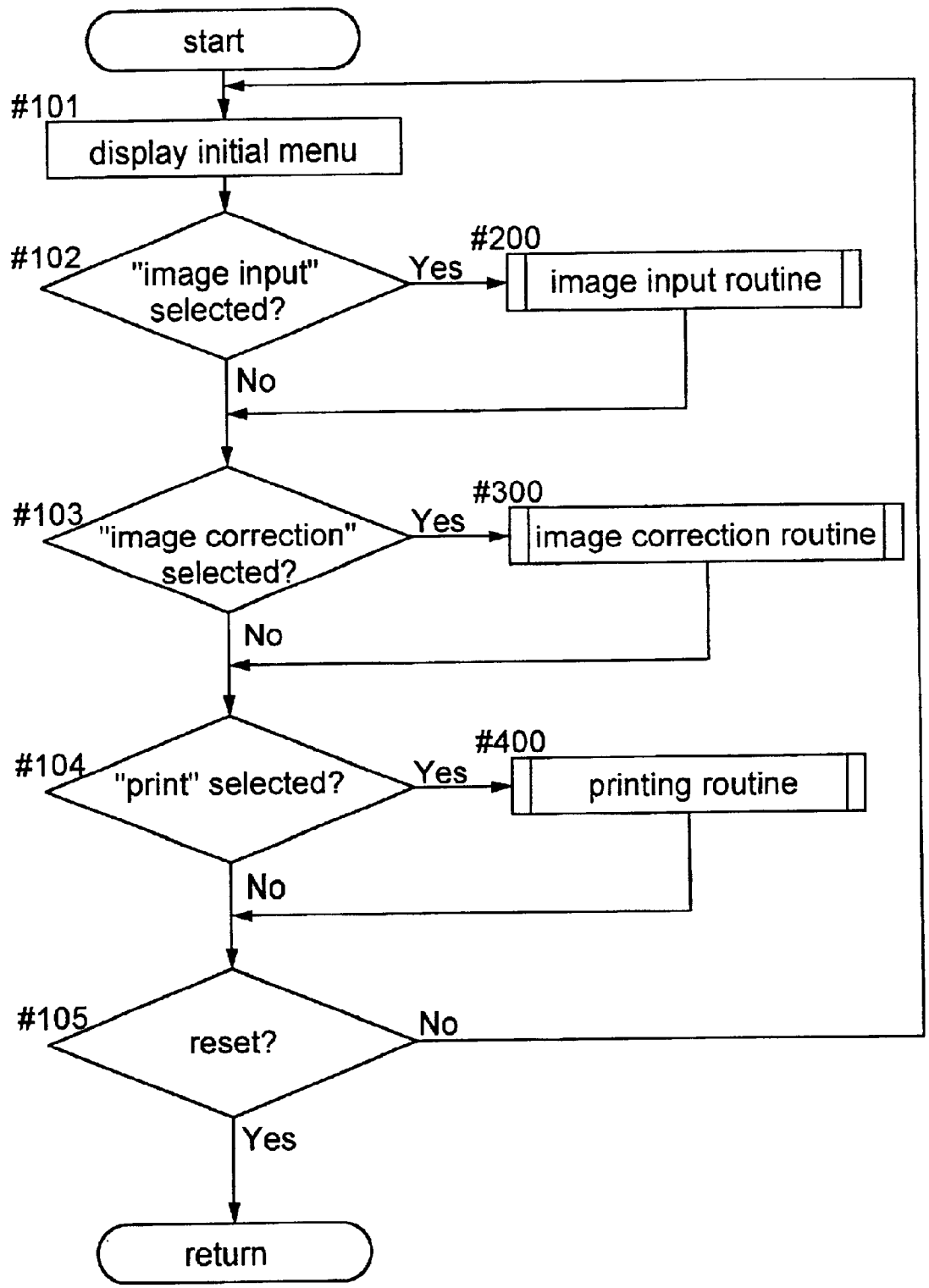
FIG. 2 is a flow chart of a basic processing operation.
Figure 7:
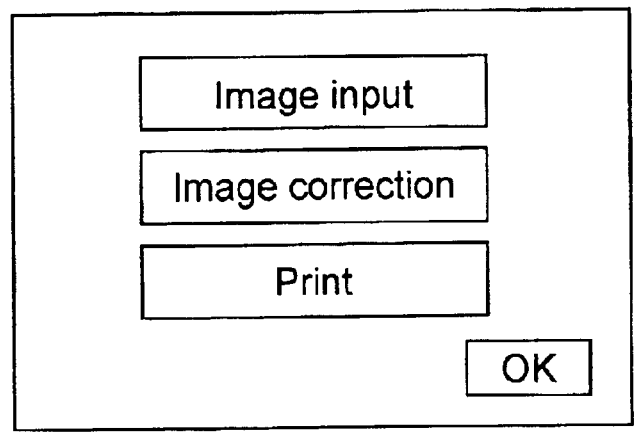
FIG. 7 is a view of an initial menu screen.

This photo printing process may be outlined as shown in the flow chart of FIG. 2. Specifically, an initial menu shown in FIG. 7 is displayed on the display 1 at an initial stage. One of the options "Image input", "Image correction" and "Print" displayed may be selected to initiate a corresponding process (steps #101–#105, #200, #300 and #400). For selecting one of "Image input", "Image correction" and "Print" from the initial menu, the keyboard 2 or mouse 3 or a touch panel appearing on the display screen is operated to move a cursor to a selected position, and an "OK" switch displayed on the screen is operated. That is, the cursor is placed in the position of "OK" and a predetermined key on the keyboard 2 is pressed or the mouse 3 is clicked.

Figure 3:
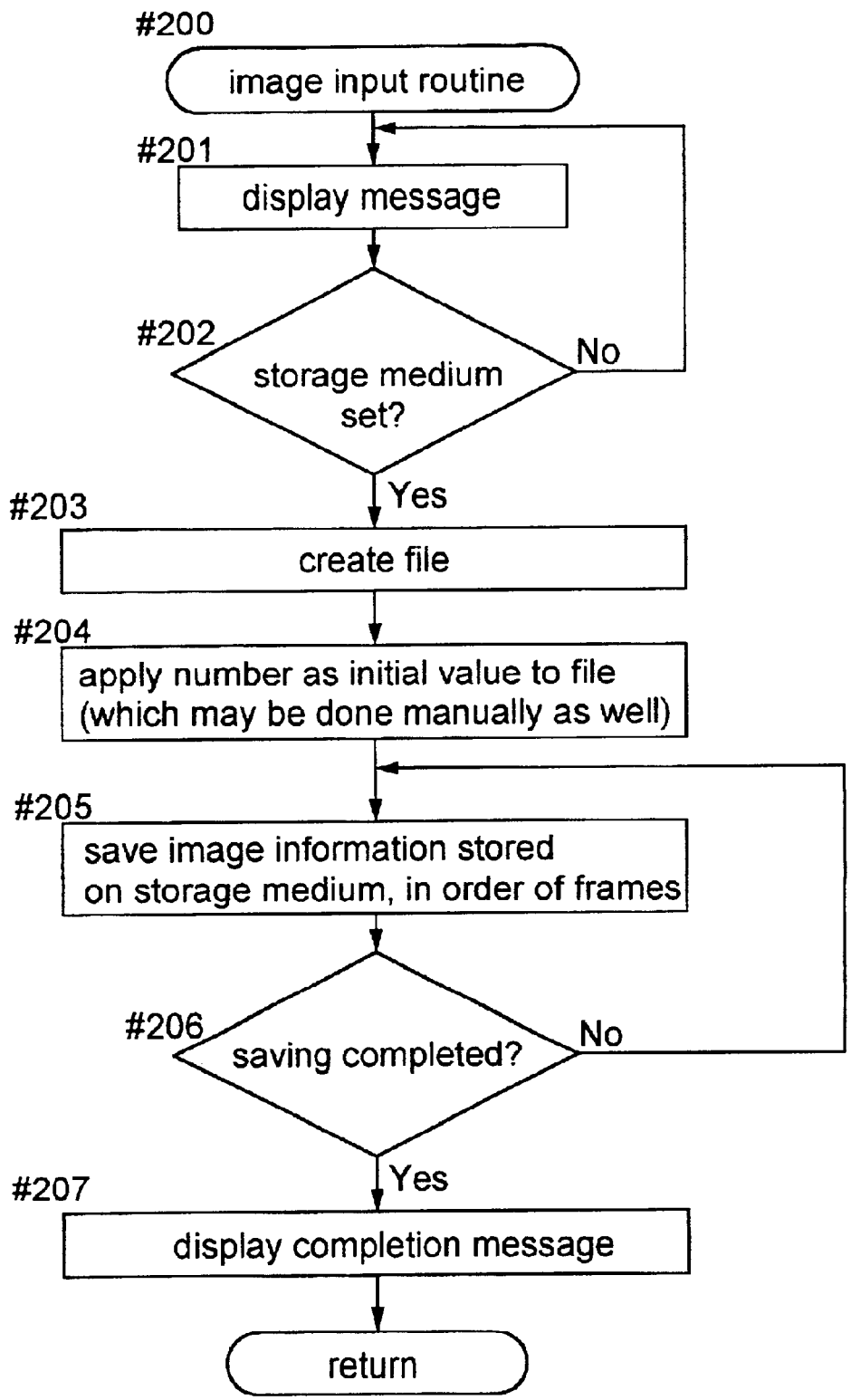
FIG. 3 is a flow chart of an image input routine.
Figure 8:
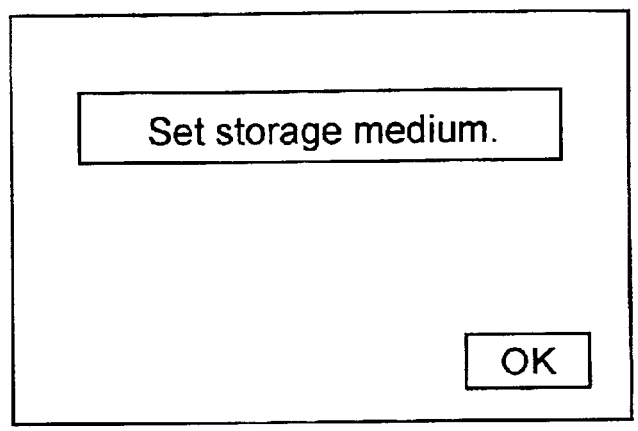
FIG. 8 is a view of a screen displayed at an initial stage of an image input process.
Figure 9:
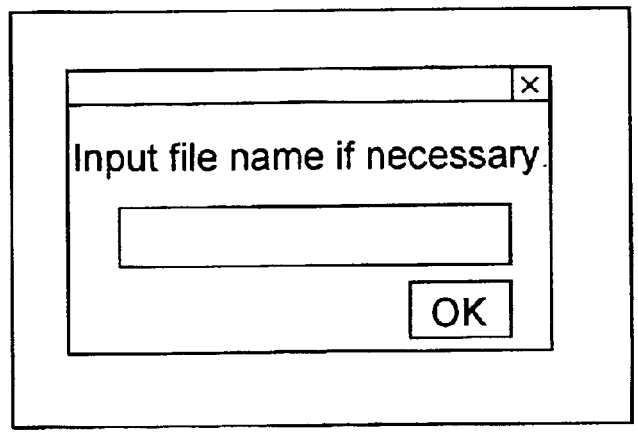
FIG. 9 is a view of a screen for inputting a file name.

When "Image input" is selected, a process is executed as shown in the flow chart of FIG. 3. That is, as shown in FIG. 8, a message appears on the screen urging the operator to set a storage medium 6 to the media reader 7. After a medium setting is confirmed, a file is created, and an order number is automatically affixed to this file (steps #201–#204). When affixing an order number to the file, a message shown in FIG. 9 may be displayed for the operator to choose to input a selected file name from the keyboard 2. Next, image information is read from the storage medium 6 set to the media reader 7, frame after frame in the order of image frame numbers. This process is carried out until image information of all frames is saved to the hard disk or memory of computer 4, as controlled with the file created as noted above. When the saving process is completed, a message indicating the completion is displayed on the display (steps #205–#207). As noted above, the file has an order number and order name affixed thereto for identifying the file. Besides, information such as the number of frames (i.e. the number of images), the date of file creation, and the data volume of the entire file (usually in bytes) is stored in the header area or the like of the file. When the saving process is completed, the display 1 returns to the screen shown in FIG. 7. The image processing device 40 of computer 4 prepares, in the background, image information to be outputted to the printers P from the image information stored. This image information to be outputted to the printers P is handled order by order based on the order numbers affixed to the files.

Figure 4:
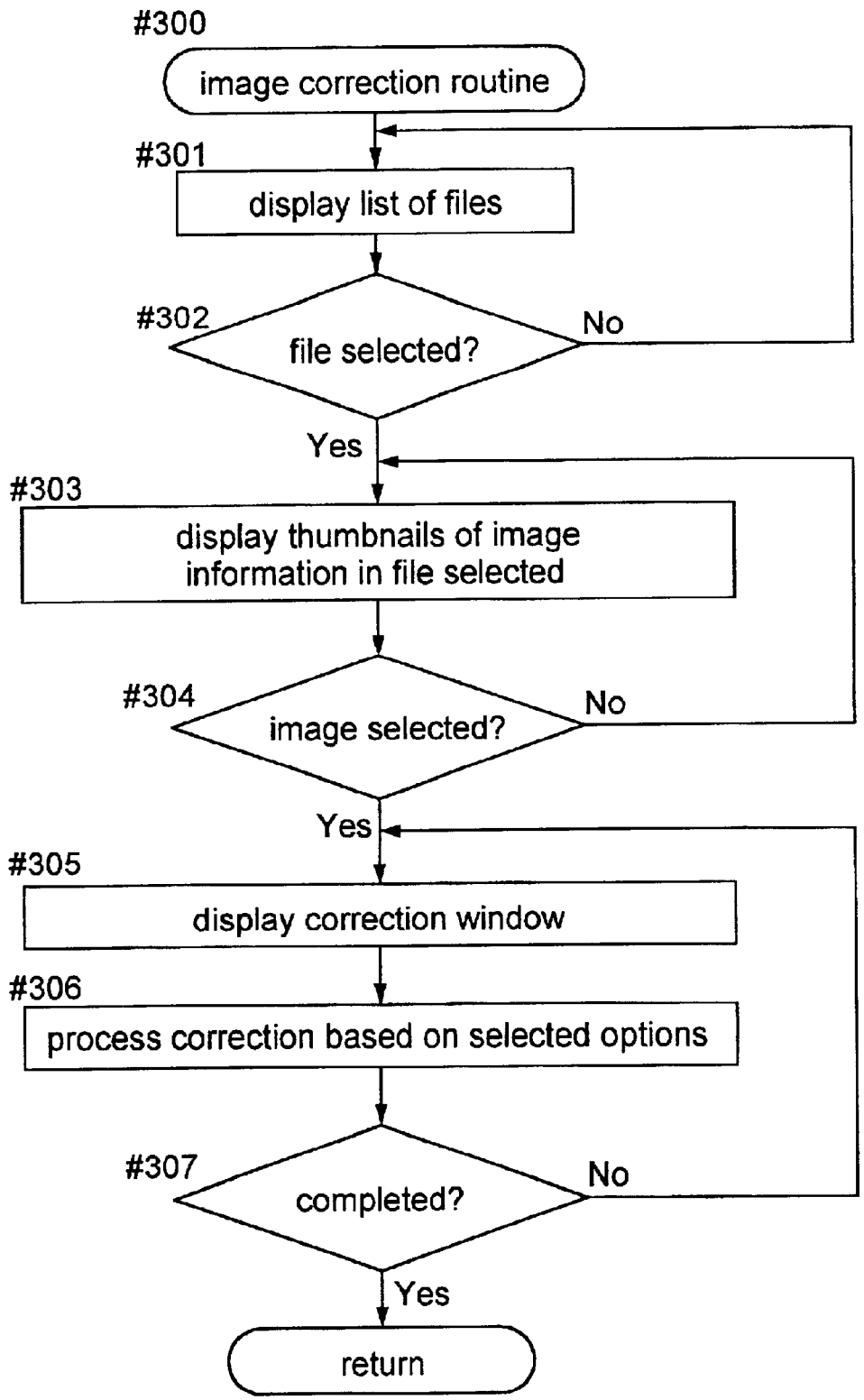
FIG. 4 is a flow chart of an image correction routine.
Figure 10:
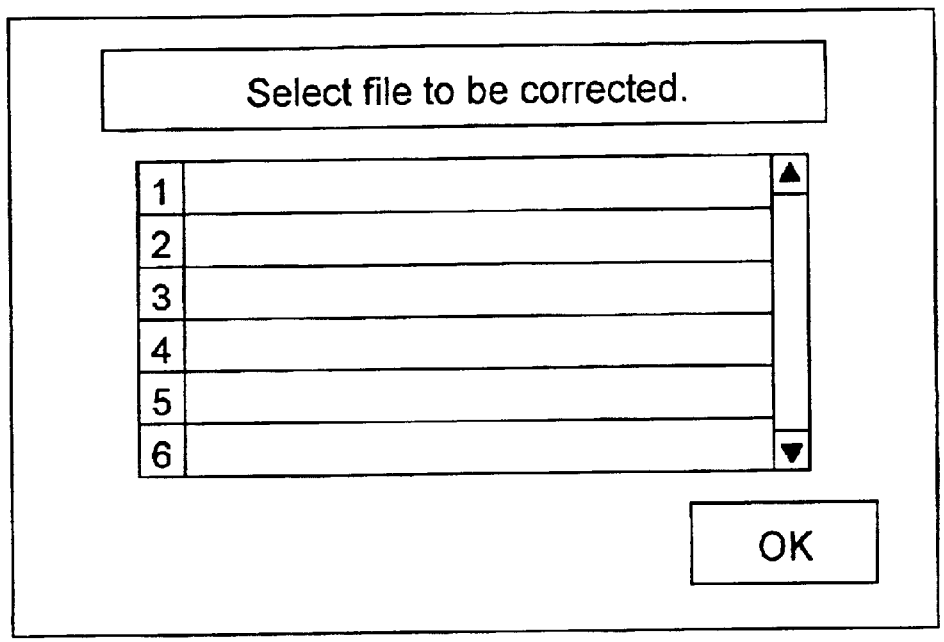
FIG. 10 is a view of a screen displaying a list of files in time of a correction process.
Figure 11:
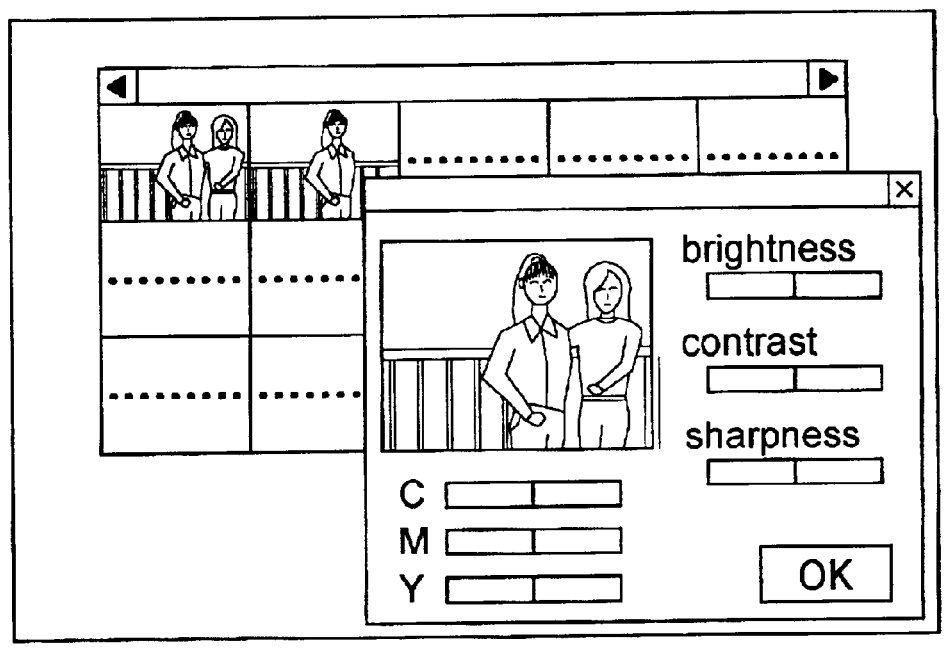
FIG. 11 is a view of a screen for the correction process.

When "Image correction" is selected, a process is executed as shown in the flow chart of FIG. 4. That is, a list of files stored in the hard disk or memory is displayed (step #301). As shown in FIG. 10, this display shows file names with smaller numbers affixed to the files saved earlier. The list may be scrolled to show all files. Next, a file to be corrected may be selected from this list by placing the cursor on the file or inputting the file number from the keyboard, or by using the touch panel noted hereinbefore. The image information in the file specified is displayed in thumbnails as shown in FIG. 11. When image information to be corrected is selected from the displayed images by a similar operation, a correction window is opened as shown in the same figure. A process is performed according to options included in the window (steps #302–#307). When image information is corrected by this "Image correction" routine, corresponding image information for print output is corrected by the image processing device 40.

Figure 5:
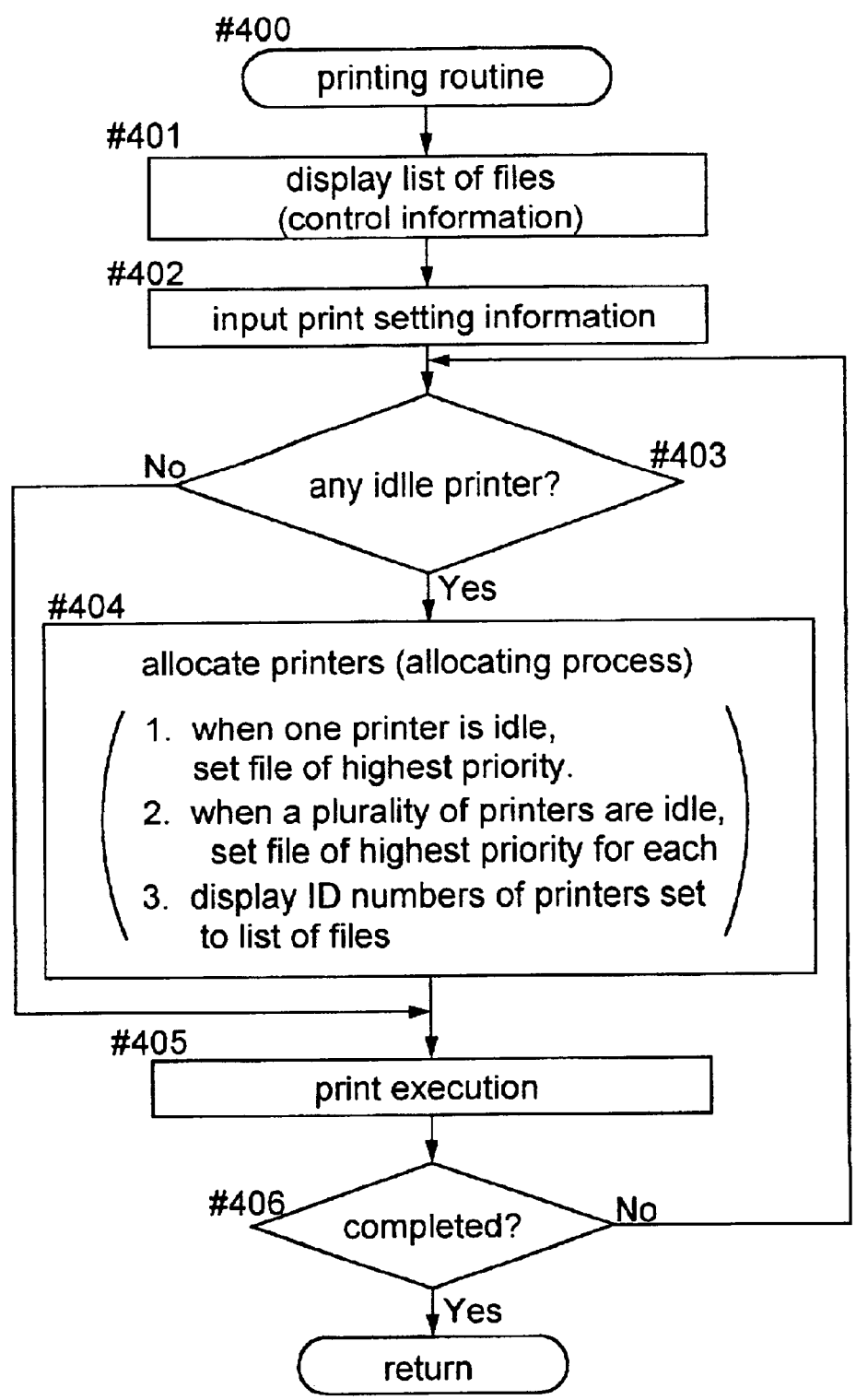
FIG. 5 is a flow chart of a printing routine.

When "Print" is selected, a process is executed as shown in the flow chart of FIG. 5. That is, a list of files stored in the hard disk or memory is displayed, and print setting information is inputted, as necessary, for each file displayed (steps #401 and #402). Specifically, the display 1 shows a list of files in the form shown in FIG. 12. Each of the files listed stores, as shown in FIG. 13, a "priority number" indicating a place in the order of priority for printing, a "file number" (file name) identifying the file, a "printed frame" specifying the frames to be printed, a "print size" specifying a print size, a "number of prints" indicating the number of prints to be made, and an "identification number of printer". The priority number reflects an order of input through the medium reader 7. For changing the order of priority for printing, the mouse 3 may be operated only to drag a selected file to a different row in the list, for example. Where necessary, the file number (file name) may be changed. The printed frame is initially set to "All frames", but a selected number may be set for a selected frame as necessary. The print size is initially set to "Standard", but a selected size may be set as necessary. The number of prints is initially set to "One each", but a selected number of prints may be set as necessary. This list of files may be scrolled to show all files.

Figure 12:
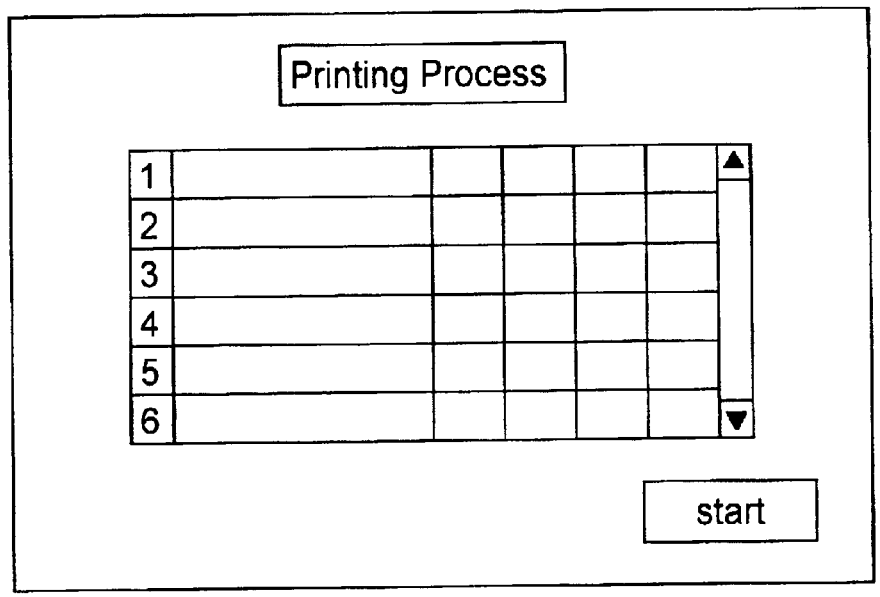
FIG. 12 is a view of a screen displaying a list of files in time of printing process.
Figure 13:
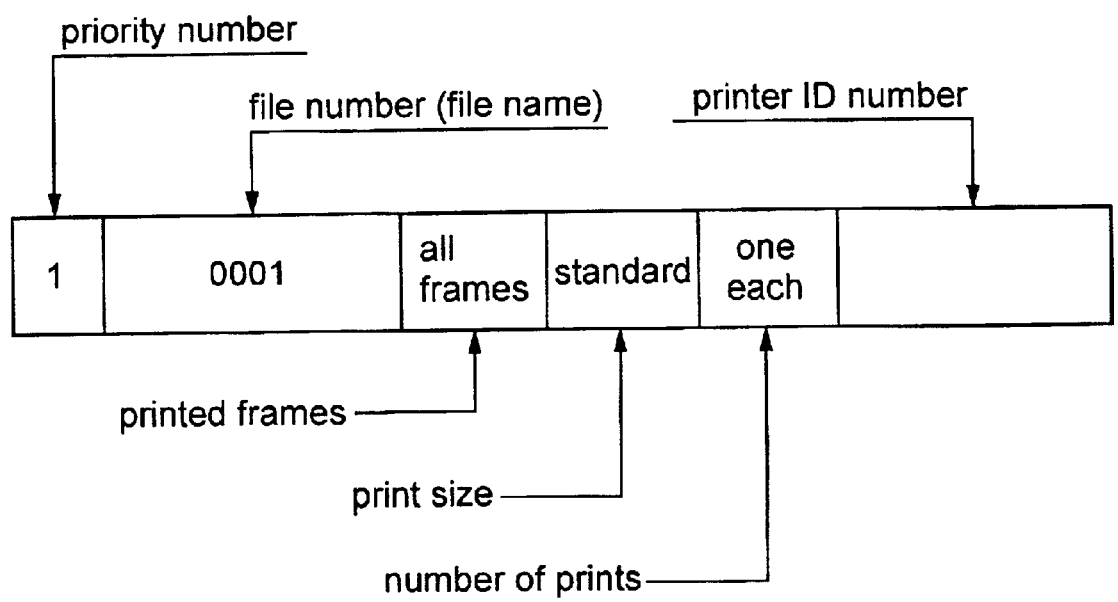
FIG. 13 is a view of a file structure displayed in time of printing process

Next, when a "start" button displayed on the display 1 as shown in FIG. 12 is operated, checking is made whether any printers P are idle (i.e. in a state for accepting printing data <Ready state>). When the printers P are idle, image information is printed by the printers P allocated by designating the identification numbers of printers P corresponding to the files. This printing process is continued until image information in all files is printed (steps #403–#406). In allocating the printers P (step #404), when only one printer P is found idle, a file with the highest priority is set to that printer P (by specifying the identification number). When a plurality of printers P are idle, orders are assigned to each printer P from files of higher priority to those of lower priority.

Figure 6:
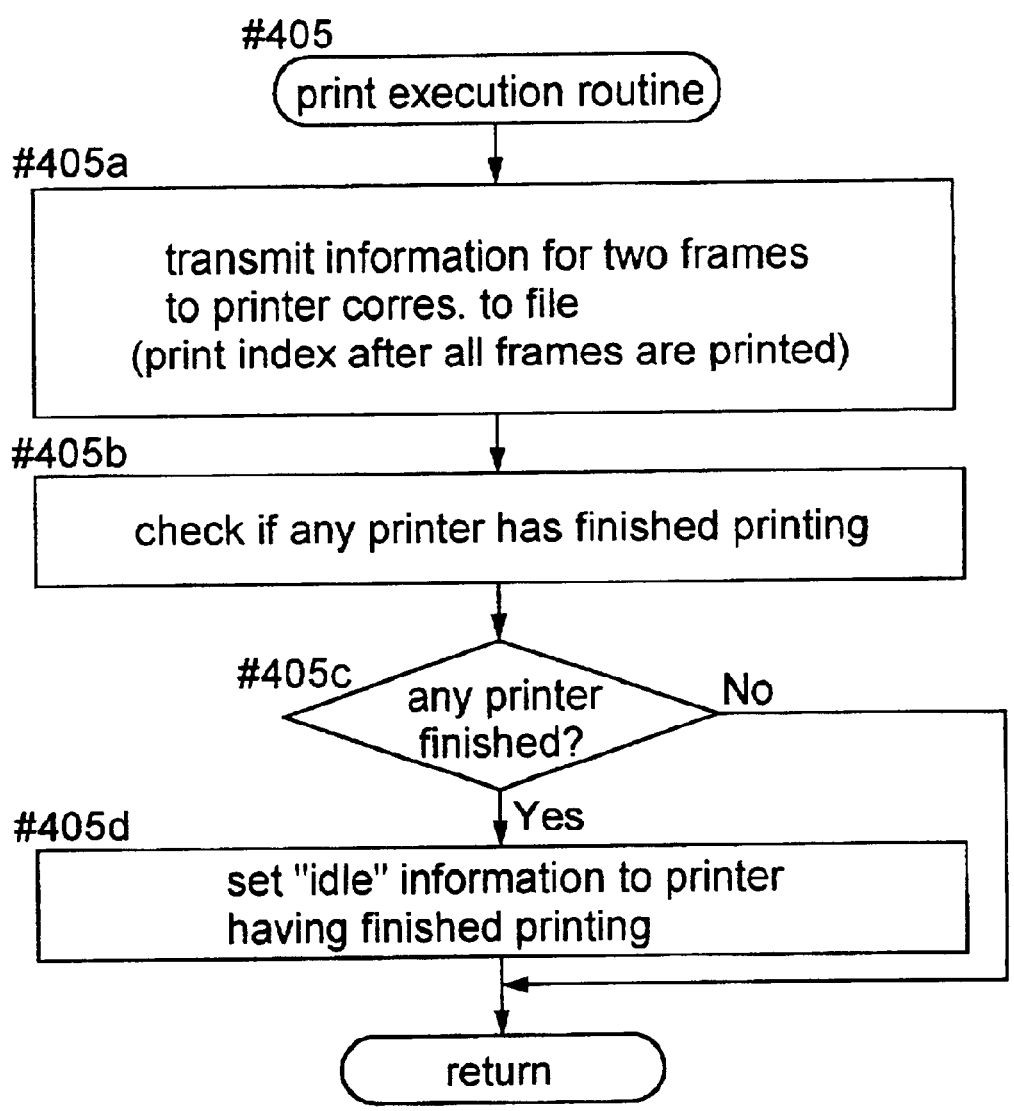
FIG. 6 is a flow chart of a print execution routine.

In transmitting image information from the computer 4 to each printer P, a volume of image information (the number of images or frames) transmitted at a time is determined based on the capacity of data storage such as a buffer or memory provided for the printer P. Each printer P in the system embodying this invention has a buffer acting as data storage and having a capacity for image information corresponding to two prints (two frames) in standard size. In executing printing (step #405), as shown in the flow chart of FIG. 6, image information for two frames to be printed of an order allocated to each printer P is transmitted successively to the printer P. The same process shown in FIG. 6 is repeated for image information for the next two frames. In this way, image information in each order is transmitted.

Each printer P starts printing immediately upon receipt of the image information. Image information for an index print is transmitted at the end of printing of each order, to print an index. Next, checking is made whether any printer P has finished printing all image information in a file allocated to the printer P. When a printer P has finished printing, "Idle" information is set to identify the available printer P, so that a next order may be allocated to this printer P (steps #405a–#405d).

Figure 14:
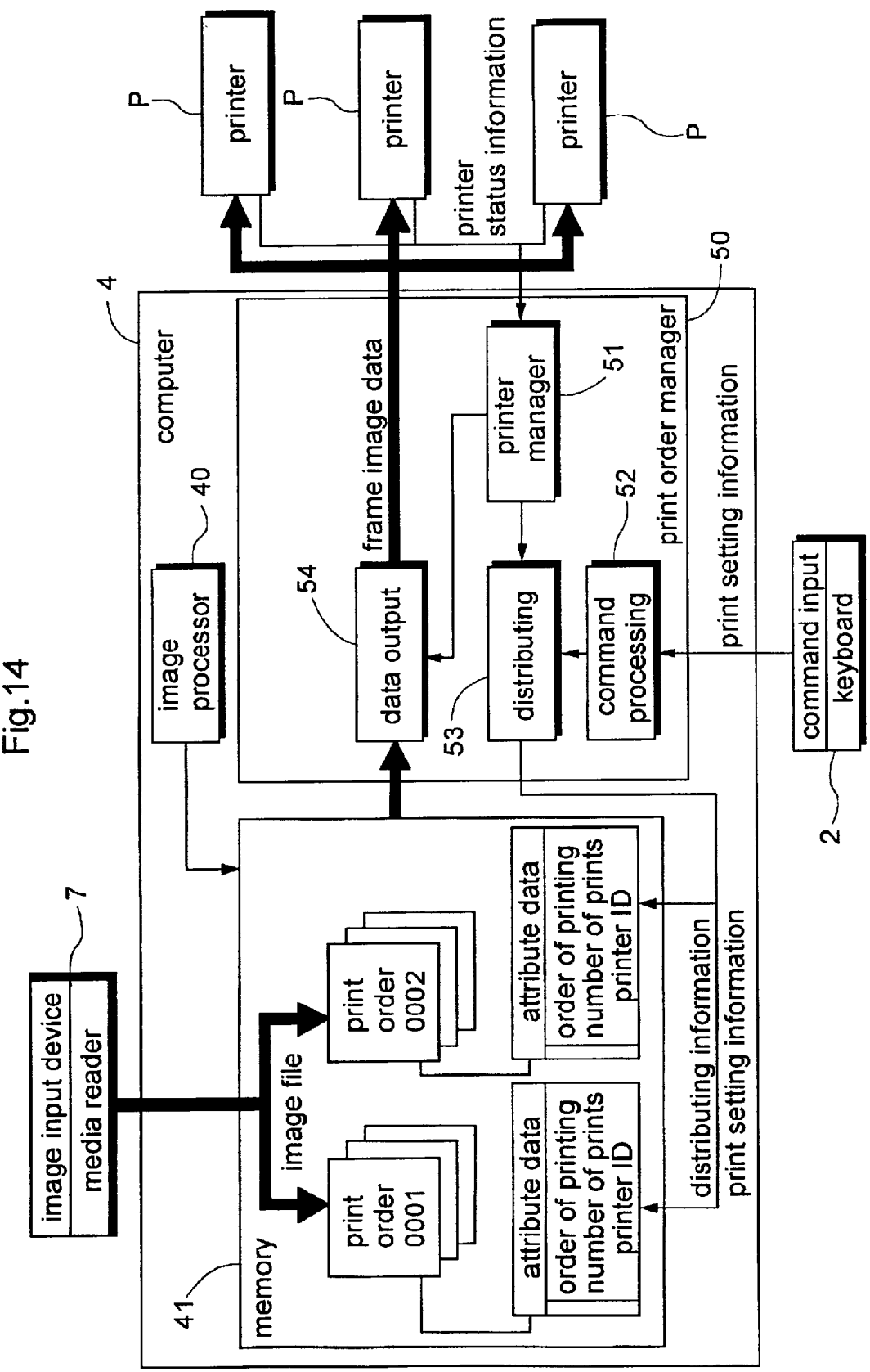
FIG. 14 is a functional block diagram showing a function for distributing image information according to this invention.

The printing process is executed by effectively using the plurality of printers according to this invention described above. This is achieved by the functions of the print order managing device 50 constructed by hardware and software in the computer 4. This aspect will be described with reference to FIG. 14.

This print order managing device 50 manages, on an order-by-order basis, image information loaded into memory 41 of the computer 4 through the image input device 7. The image information includes image files having frame image data, and attribute data linked to the image files. The attribute data includes an order of printing, the number of prints, and a printer ID. The order of printing is set for each image file, while the number of prints and printer ID may be set for each frame image data.

This print order managing device 50 includes a printer managing unit 51 for acquiring an operating status (printing, finished printing or preparing for printing) from each printers P, an input command processing unit 52 for creating print setting information (the number of prints, printing priorities and so on) from commands inputted through the input device such as the keyboard 2 acting as a command input device, a distributing unit 53 for writing attribute data for printer selection to the image files or frame image data loaded into the memory 41 of computer 4 through the image input device 7, and a data output unit 54 for transmitting pertinent frame image data from the memory 41 to pertinent printers P based on a trigger signal from the printer managing unit 51.

The distributing unit 53 writes an order of printing and the number of prints to the attribute data in the image file of a corresponding order based on the print setting information transmitted from the input command processing unit 52, and writes a printer ID to the attributes data based on operating status information on the printers P transmitted from the printer managing unit 51. At this time, the order of printing is set, as a default value, an order in which the image files are loaded into the memory 41. The printer ID determines a printer P to be used. Priority is given to a printer P currently in idle state or a printer P with the least operating load at that time. When the printers P have different specifications, a printer P meeting desired printer specifications is selected.

The data output unit 54 outputs frame image data from the memory 41 to a selected printer P, triggered by operating status information on the selected printer P from the printer managing unit 51, i.e. a status signal indicating a completion of printing or printing data acceptance permission. The data output unit 54 has a function to check an order completion so as to transmit continuously frame image data belonging to each image file created on the order-by-order basis. That is, unless an order is completed, frame image data in the same image file is read from the memory 41.

Thus, in the photo printing system according to this invention, one computer 4 is capable of a managing process for managing a plurality of images by file format, and an distributing process for distributing the image information managed as above to the printers P on the order-by-order basis. Image information stored in the computer 4 may be printed efficiently by using the plurality of printers P, without requiring a manual operation to select among the plurality of printers P, and without leaving the printers P in idle state (inactive state). Moreover, each storage medium 6 is associated with one file and, in time of printing, each file is associated with one printer P. Thus, image information in each order is printed as one unit by one printer P, to facilitate the management of orders. Since images are printed file by file according to a predetermined order of priority, required image information may be printed and delivered to customers promptly only by assigning priorities before printing. Moreover, the display 1 shows a list indicating a relationship between order and printer P. When printing is completed, finished prints may be sorted order by order with ease. Image information in each order is transmitted successively as divided in units of frames storable in the buffer of printer P corresponding to the order. Though the buffer of each printer P has a small capacity, the printing process need not be interrupted.

[Different Embodiment]

Besides the above embodiment, this invention may be implemented as follows. Like reference numerals are used to identify like parts in this embodiment which are the same as in the foregoing embodiment.

Figure 15:
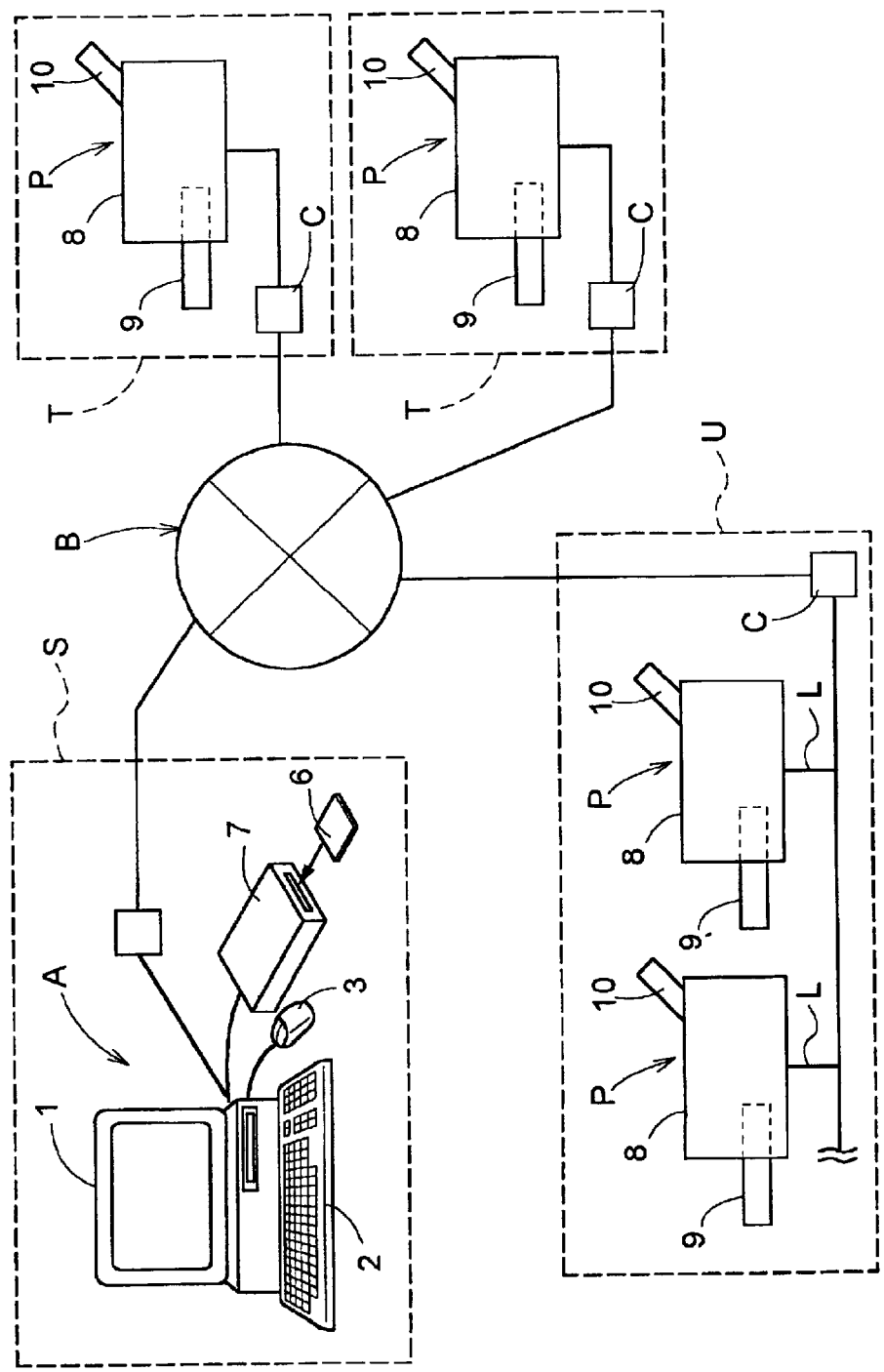
FIG. 15 is a view showing a construction in a different embodiment.

As shown in FIG. 15, when a storage medium 6 from a digital camera is received at a terminal A of a photo processing shop S not having a printer P for printing digital images, image information in the storage medium 6 may be inputted to this terminal A. A communication system may be formed to transmit this image information, through the Internet B and servers C, to printers P installed at other shops T in the vicinity, a particular service center U or the like, to have the image information printed. In this communication system, the server C at the service center U corresponds to the processing device of this invention. The server C and a plurality of printers P at the service center U and signal paths L for transmitting image information to the server C and printers P constitute a photo printing system. When printing images through this communication system, information identifying the photo processing shop S may be attached to the image information transmitted from the photo processing shop S. Then, finished prints may be delivered to the photo processing shop S by using a motorcycle delivery service or door-to-door delivery service. Thus, with this construction, even a small photo processing shop not having printers P for printing digital images may provide printing services only by installing a communication terminal. When a photo processing shop having printers P for printing digital images has received large orders exceeding its processing capabilities, the above system enables a processing with ease.

According to this invention, as described in the embodiments, the system is operable in a mode for printing images by distributing a plurality of orders to a plurality of printers P. This system may operate also in a mode for distributing printing data in one order to the plurality of printers when the printers are available for printing. By selecting such a mode, the image information in the order may be printed in a short time to achieve an efficient processing.

In this invention, orders may be managed with increased reliability by using a printer capable of back printing to print order numbers and the like on the back of printing paper. The printers may be the type to print on silver salt printing paper. Image information processed by the system may be image information on photo films digitized by a scanner.

What is claimed is:

1. A photo printing system for transmitting image information including photo frame image data to a plurality of printers through signal paths to print images, comprising:
   a memory for loading image information transmitted from an image input device;
   a print order managing unit for managing said image information on an order-by-order basis;
   an input command processing unit for creating print setting information including the number of prints from commands inputted through a command input device;
   a printer control unit for checking an operating status of each of said printers;
   a distributing unit for applying, based on the operating status, printer IDs identifying the printers used and acting as distributing setting information in the form of attribute data, to the image information in the respective orders, and further applying the print setting information transmitted from said input command processing unit, in the form of attribute data, to the image information in the respective orders; and
   a data output unit for transmitting, based on a signal from said printer control unit, photo frame image data in the image information to be printed from said memory to one of said printers specified by the distributing setting information included in the attribute data of the image information, and causing said one of said printers to effect printing according to the number of prints specified by the print setting information.

2. A photo printing system as defined in claim 1, wherein said print setting information includes a printing priority.

3. A photo printing system as defined in claim 1, wherein said distributing unit applies, as said distributing setting information, at least one printer ID of a printer currently in idle state or a printer with the least operating load currently.

4. A photo printing system as defined in claim 1, wherein said distributing unit applies said attribute data to the respective photo frame image data.

5. A photo printing system as defined in claim 4, wherein said distributing unit applies different printer IDs to the photo frame image data belonging to the image file of the same print order.

6. A photo printing method for transmitting image information including photo frame image data to a plurality of printers through signal paths to print images, comprising the steps of:
   loading a memory with image information transmitted from an image input device, and managing said image information on an order-by-order basis;
   creating print setting information including the number of prints from commands inputted through a command input device;
   checking an operating status of each of said printers;
   applying, based on the operating status, printer IDs identifying the printers used and acting as distributing setting information in the form of attribute data, to the image information in the respective orders, and further applying the print setting information in the form of attribute data to the image information in the respective orders; and
   based on a signal from a printer control unit, transmitting photo frame image data in the image information to be printed from said memory to one of said printers specified by the distributing setting information included in the attribute data of the image information, and causing said one of said printers to effect printing according to the number of prints specified by the print setting information.

7. A photo printing method as defined in claim 6, wherein said print setting information includes a printing priority.

8. A photo printing method as defined in claim 6, wherein at least one printer ID of a printer currently in idle state or a printer with the least operating load currently is applied as said distributing setting information.

9. A photo printing method as defined in claim 6, wherein said attribute data is applied to the respective photo frame image data.

10. A photo printing method as defined in claim 9, wherein different printer IDs are applied to the photo frame image data belonging to the image file of the same print order.

* * * * *